United States Patent
Reynolds

(10) Patent No.: US 6,333,489 B1
(45) Date of Patent: Dec. 25, 2001

(54) WELDING POWER SUPPLY WITH REDUCED OCV

(75) Inventor: Jon O. Reynolds, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/606,453

(22) Filed: Jun. 29, 2000

(51) Int. Cl.[7] ................. B23K 9/10; G05F 1/10
(52) U.S. Cl. ................. 219/130.33; 323/237
(58) Field of Search ................. 323/237, 246; 219/108, 110, 130.1, 130.21, 130.31, 130.32, 130.33, 137 PS

(56) References Cited

U.S. PATENT DOCUMENTS

| | | | |
|---|---|---|---|
| 4,349,720 | * 9/1982 | Makimaa | 219/130.33 |
| 4,450,340 | * 5/1984 | Corrigall et al. | 219/132 |
| 5,355,300 | * 10/1994 | Zinn | 363/146 |
| 6,005,220 | * 12/1999 | Bunker et al. | 219/130.33 |
| 6,013,892 | * 1/2000 | Buda et al. | 210/110 |

* cited by examiner

Primary Examiner—Matthew Nguyen
(74) Attorney, Agent, or Firm—George R. Corrigan

(57) ABSTRACT

A method and apparatus for providing welding power includes controlling a phase controlled power circuit to provide a reduced OCV output. Preferably, the output is controlled in response to feedback, such as current being less than or greater than a threshold.

22 Claims, 2 Drawing Sheets

WELDING POWER SUPPLY WITH REDUCED OCV

FIELD OF THE INVENTION

The present invention relates generally to power supplies and, in particular to a method and apparatus for providing power with a reduced open circuit voltage.

BACKGROUND OF THE INVENTION

There are many known types of welding power supplies. One known type of welding power source is a phase controlled power source and includes a power circuit having controllable switches, such as SCRS, that are phase controlled. The phase controlled power supplies are relatively simple, robust and inexpensive.

Generally, phase controlled power supplies receive an ac input and provide an ac output, a rectified ac output, or a dc output. They control the amount of power provided by controlling the phase of an input ac cycle at which the controllable switches are turned on. Typically, the switches turn off at the next zero crossing. Thus, the portion of the input cycle from the on time to the zero crossing is provided as an output. (AC cycle length, as used herein, is the length of time from one zero crossing until the next zero crossing, or the length of time from one SCR being turned on, until the next SCR is turned on). A greater voltage output is provided by turning on earlier in each cycle, thus providing a greater portion of the input cycle as the output. A lesser output voltage is provided by turning on later in the cycle, and providing a lesser portion of the input cycle as the output. Current control can be obtained by feeding back output current to the phase angle regulator.

One such known phase control power supply is the Miller Mark VI™ power source. The Miller Mark VI™ power source is a multi-user power source that includes six phase controlled power circuits, one for each user output. The power circuits provide a dc cv (constant voltage) or cc (constant current)output. The power circuits include an SCR phase controlled rectifying bridge that receives an ac input. The output of the bridge is provided to an output circuit that includes an inductor to smooth the output. A controller receives a feedback signal, and compares the feedback signal to a user setpoint. The phase of the SCR firing is controlled in response to the comparison.

When the welding arc is initially created, a relatively high voltage (80V e.g.) is desirable. The relatively high voltage helps stabilize and create the arc. However, a higher voltage will possibly cause the user discomfort in the event the user touches both outputs. Accordingly, it is well-known in the art to provide circuitry which helps create a reduced open circuit voltage. Thus, when welding is not occurring the output voltage is reduced to a level which is less likely to cause the user discomfort. When the welding process begins a higher voltage is provided which is sufficient to start the arc. One such prior art circuit is shown in U.S. Pat. No. 5,513,093 (Corrigall et al), which is assigned to the owner of this invention, and is hereby incorporated by reference.

Other attempts have been made in prior art to provide a reduced open circuit voltage. However, such prior art attempts are generally not well-suited to use with a phase controlled power supply, are relatively complicated or do not provide a sufficiently reduced voltage without interfering with arc starting.

Accordingly, a phase controlled welding power supply that provides a reduced open circuit output voltage is desirable. Additionally, the reduced open circuit voltage should not interfere with arc starting and arc stability.

SUMMARY OF THE PRESENT INVENTION

According to a first aspect of the invention a welding power supply includes a phase controlled power circuit, an output sensing circuit and an OCV reduction circuit. The power circuit receives an ac input and provides output power in response to phase control signals. The output sensing circuit senses the output and provides a feedback signal. The OCV reduction circuit receives the feedback signal and provides a voltage reduction phase control signal as a phase control signal.

The output sensing circuit senses the output current in one embodiment and the phase controlled power circuit is disposed to provide an output voltage in response to at least two phase control signals in other embodiments The controller receives the feedback signal and a user selected signal, and provides a set point phase control signal as a phase control signal in an alternative. The controller combines the set point phase control signal and the voltage reduction phase control signal to produce a single phase control signal in another embodiment.

An output circuit, including an RC circuit across two terminals, is provided in one embodiment. The RC circuit preferably has a time constant greater than the duration of one-half of SCR cycle length.

A method of providing welding power is provided in accordance with another aspect of the invention. The method includes receiving an ac input and phase controlling a power circuit to providing output power. An output feedback signal is provided and the power circuit is phased back in response to the feedback when the output current is below a threshold.

The feedback is current feedback in one alternative.

Phase controlling includes receiving at least two phase control signals in one embodiment, and one of the phase control signals is derived from a user setpoint in another embodiment. The phase control signals are combined to form a single signal in another embodiment.

The output is smoothed when the voltage is reduced in another embodiment.

A welding power supply includes a phase controlled power circuit, an output sensing circuit and a controller in accordance with a third aspect of the invention. The power circuit receives an ac signal having a cycle length and provides output power to an output circuit. The output circuit includes an RC circuit having a time constant greater than the cycle length. The output sensing circuit senses the output and provides a feedback signal. The controller receives the feedback signal and provide a phase control signal.

Other principal features and advantages of the invention will become apparent to those skilled in the art upon review of the following drawings, the detailed description and the appended claims.

Figure 1:
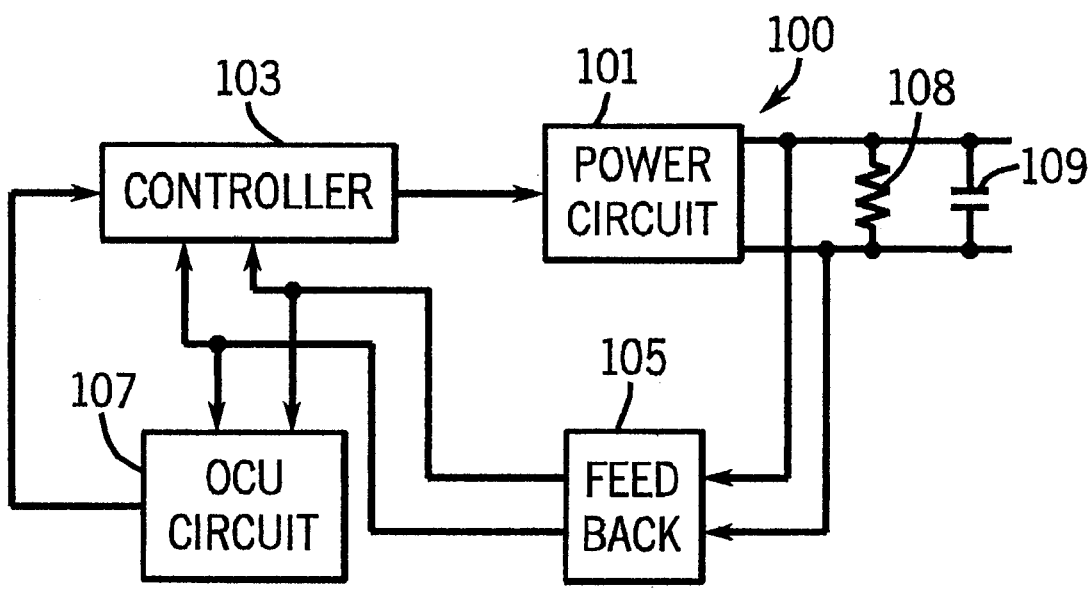
FIG. 1 is a block diagram of the welding power supply constructed in,accordance with the preferred embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular power circuit and particular control circuitry, it should be understood at the outset that the invention of providing a reduced open circuit voltage may also be implemented with other power circuitry, control circuitry, and in other environments.

Generally, the invention provides that a welding power supply has a reduced open circuit voltage, but a voltage sufficient to start the arc and to maintain the arc during the welding process. The welding power supply is, in the preferred embodiment, a phase controlled power supply. The reduced open circuit voltage is obtained by phasing back the power during an open circuit condition. An open circuit condition is determined to exist when the output current is less than a threshold (7.5 amps in the preferred embodiment).

The preferred embodiment will be described with respect to a prior art phase controlled welding power source, such as the Miller Mark VI™. The Miller Mark VI™ is well known in the art, and it is described in the Mark VI™ owner's manual OM-2211, August 1998.

A block diagram of a welding power supply 100, constructed in accordance with the preferred embodiment is shown in FIG. 1. Welding power supply 100 includes a power circuit 101, a controller 103, a feedback circuit 105 and an OCV reductions circuit 107. Power circuit 101, controller 103, and feedback circuit 105 are constructed in accordance with the prior art Miller Mark VI™, and will not be described in detail herein. While these components are found in the Miller Mark VI™ in the preferred embodiment, they may readily be implemented using other power supplies, such as other welding power supplies and other phase control circuits.

Generally, power circuit 101 includes an SCR rectifying bridge. Each SCR is turned on at a desired time within each cycle (phase controlled) by controller 103. Controller 103 receives a signal indicative of the output from feedback circuit 105, and compares the feedback signal to a user setpoint. Controller 103 determines the phase angle at which to turn on the SCRs in response to that comparison, as is well known in the art.

A resistor 108 (10 K Ohms) and a capacitor 109 (10 microfarads) are provided across the output terminals. This RC circuit smooths the output when a reduced open circuit voltage is provided. Because the reduced open circuit voltage is provided by phasing back the turn on of the SCRs, without the RC circuit the open circuit output voltage would have peaks substantially higher than the average voltage. The RC circuit, which has a time constant out of 0.1 seconds, is able to allow the peak voltage to last the entire cycle. The RC time constant should be selected such that a desirable output voltage is obtained when the open circuit voltage is reduced.

Figure 2:
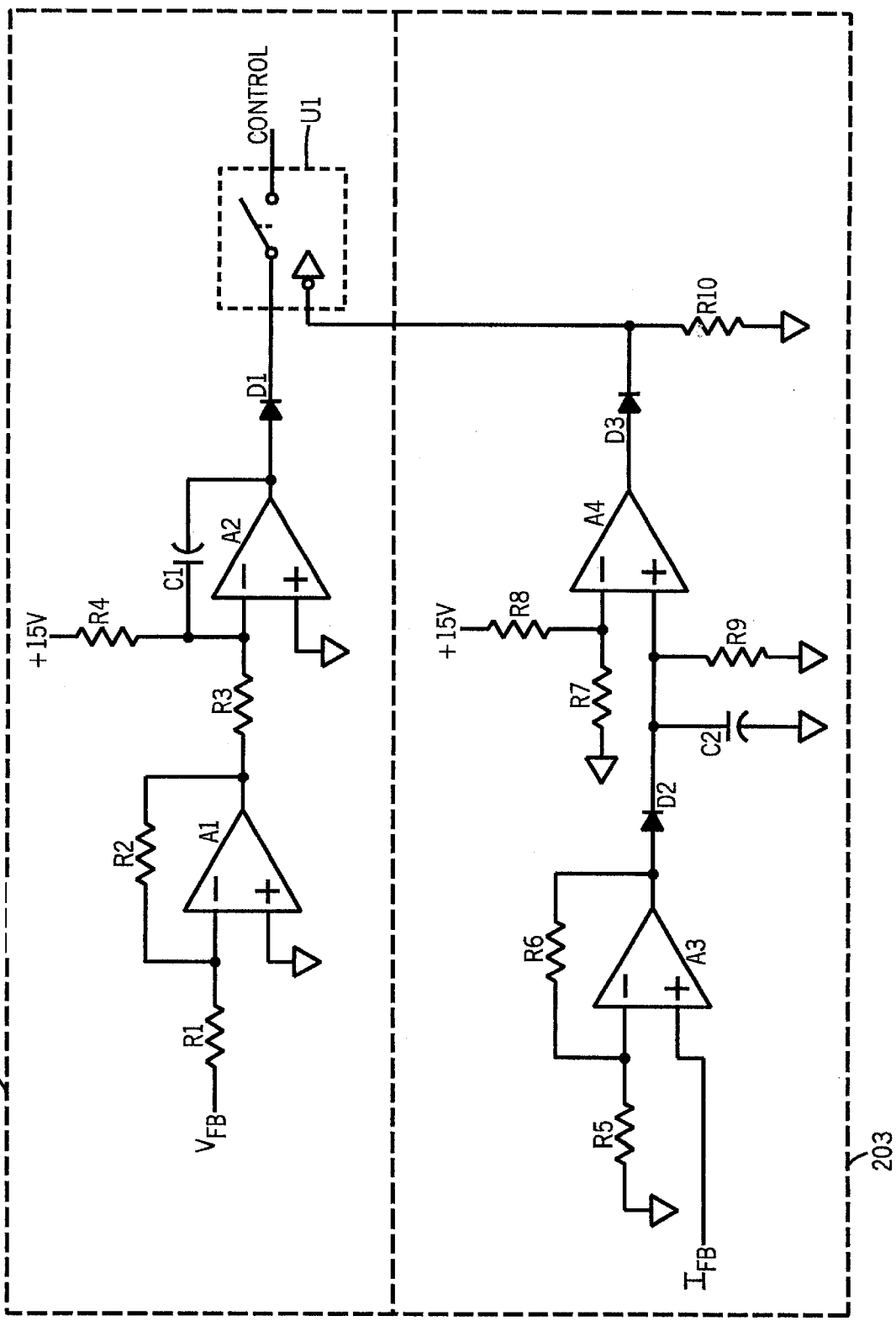
FIG. 2 is a circuit diagram of an open circuit voltage reduction circuit in accordance with the preferred embodiment.

A circuit implementing open circuit voltage reduction circuit 107 is shown in FIG. 2 and includes a voltage reduction circuit 201 and a current sensing circuit 203. Voltage reduction circuit 201 receives as an input $V_{FB}$, which is a voltage feedback signal having one volt equal to 10 volts of arc voltage. $V_{FB}$ is provided to an amplifier A1 through a resistor R1 (10 K Ohms). A feedback resistor R2 (51.1 K Ohms) results in a gain of about 5 for amplifier A1.

Amplifier A1 is an inverting amplifier and its output is provided through a resistor R3 (200 K Ohms) to an amplifier A2. Amplifier A2 also receives as an input a dc bias signal provided through a resistor R4 (332 K Ohms). A feedback capacitor C1 (1 $\mu$F) is provided so that amplifier A2 integrates the difference between the voltage feedback signal and the dc bias current. The output of amplifier A2 passes through a diode and onto a switch U1.

When switch U1 is closed the output of amplifier A2 is provided to a node in control circuit 103 that sets the phase angle of the SCR bridge. The node voltage that controls the phase angle is scaled such that −2.1 volts causes the bridge to phase full on, and plus 10 volts causes the bridge to phase full off (0 output voltage). Diode U1 makes the combination of OCV control signal and the normal operating control signal an OR connection, so the voltage regulator can phase the bridge back but can't phase the bridge on.

When the voltage reduction circuit is on (switch U1 is closed) the phase angle will be phased back as determined by the voltage reduction circuit. But, when the voltage reduction circuit is off (switch U1 is open) the phase angle will be controlled in accordance with the prior art control scheme.

Current sensing circuit 203 receives a current feedback signal $I_{FB}$ which is provided to an amplifier A3. Amplifier A3 includes feedback resistors R5 (1 K Ohms) and R6 (100 K Ohms). $I_{FB}$ is scaled such that one volt corresponds to 100 amperes of output current. The output of amplifier A3 is scaled such that one amp of output current equals one volt, and is provided through a diode D2 to an amplifier A4. A capacitor C2 (3.3 microfarads) and a resistor R9 (1 Meg Ohm) provide a time delay as will be described below. Amplifier A4 also receives as an input a voltage divided signal from a resistor R7 (10 K Ohms) and a resistor R8 (10 K Ohms).

Amplifier A4 is a comparitor that compares the signal on capacitor C2 to the voltage divided signal. The output of comparitor A4 is provided through a diode D3 and a resistor 10 (10 K Ohms) to the control input of switch U1.

When the load current is less than 7.5 amps, the output of comparitor A4 is low, and causes switch U1 to be closed. When switch U1 is closed the output of the voltage reduction circuit is provided to the phase angle regulator in control circuit 103.

When the load current exceed 7.5 amps, the output of comparitor A4 switches to plus 15 volts. This opens switch U1 and releases the voltage clamp on the phase angle regulator. When the phase angle clamp is released, the maximum output voltage is 80 volts (while welding).

When the welding arc is broken capacitor C2 and resistor R9 provide a delay of approximately three seconds before capacitor C2 discharges to less than 7.5 V. Thus, the reduced open circuit voltage is not provided until after the three second delay. If the welder inadvertently or erroneously breaks the arc there is a three second time during which the arc may be re-established without the output voltage being reduced.

When the welding process is started, the output voltage will be reduced because no-load current is being provided. The welder uses a contact start (touches the electrode to the workpiece) so that current begins to flow. When the current exceed 7.5 amps, the output voltage is no longer reduced, as described above.

Numerous modifications may be made to the present invention which still fall within the intended scope hereof. Thus, it should be apparent that there has been provided in accordance with the present invention a method and apparatus for providing a reduced open circuit voltage that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding power supply comprising:
   a phase controlled power circuit disposed to receive an ac signal and provide output power in response to at least one phase control signal;
   an output sensing circuit disposed to sense the output and provide a feedback signal in response thereto; and
   a voltage reduction circuit disposed to receive the feedback signal and provide a voltage reduction phase control signal as one of the at least one phase control signals.

2. The apparatus of claim 1 wherein the output sensing circuit is disposed to sense the output current.

3. The apparatus of claim 1 wherein the phase controlled power circuit is disposed to provide an output voltage in response to at least two phase control signals.

4. The apparatus of claim 3 further comprising a controller disposed to receive the feedback signal and a user selected signal, and further disposed to provide a set point phase control signal as one of the at least two phase control signals in response thereto.

5. The apparatus of claim 4 wherein the controller further comprises circuitry which combines the set point phase control signal and the voltage reduction phase control signal to produce a single phase control signal.

6. The apparatus of claim 1 further comprising an output circuit, including first and second output terminals and a capacitor disposed across the first and second output terminals, and further comprising a resistor disposed across the first and second output terminals.

7. The apparatus of claim 6 wherein the ac signal has an ac cycle length, and further wherein the capacitor and resistor form an RC circuit having a time constant greater than the duration of one-half of the ac cycle length.

8. A welding power supply comprising:
   power circuit means for providing output power from ac input power in response to at least one phase control signal;
   feedback means for sensing the output and provide a feedback signal in response thereto; and
   voltage reduction means for phasing back the power circuit means in response to the feedback means when the output is below a threshold.

9. The apparatus of claim 8 wherein the feedback means includes means for sensing the output current.

10. The apparatus of claim 8 wherein the power circuit means includes means for receiving at least two phase control signals.

11. The apparatus of claim 10 further comprising means for providing a set point phase control signal.

12. The apparatus of claim 11 further comprising means for combining the set point phase control signal and a voltage reduction phase control signal to produce a single phase control signal.

13. The apparatus of claim 8 further comprising output means including means for providing a time constant.

14. A method of providing welding power comprising:
   receiving an ac input and phase controlling a power circuit to providing output power;
   sensing the output and provide a feedback signal in response thereto; and
   phasing back the power circuit means in response to the feedback means when the output current is below a threshold.

15. The method apparatus of claim 14 wherein the sensing the output includes sensing the output current.

16. The method of claim 14 wherein phase controlling includes receiving at least two phase control signals.

17. The method of claim 16 further comprising providing a set point phase control signal.

18. The method of claim 17 further comprising combining the set point phase control signal and a voltage reduction phase control signal to produce a single phase control signal.

19. The method of claim 14 further comprising smoothing the output with a circuit having a time constant.

20. The method of claim 19 wherein the ac signal has an ac cycle length, and further wherein time constant is greater than the duration of one-half of the ac cycle length.

21. A welding power supply comprising:
   a phase controlled power circuit disposed to receive an ac signal having a cycle length and provide output power to an output circuit in response to at least one phase control signal, wherein the output circuit includes an RC circuit having a time constant greater than an ac cycle length;
   an output sensing circuit disposed to sense the output and provide a feedback signal in response thereto; and
   a controller disposed to receive the feedback signal and provide the at least one phase control signal.

22. A welding power supply comprising:
   means for receiving an ac input signal having a cycle length and for providing phase controlled power;
   delay means for providing a smoothed output, the delay means being connected to an output of the means for receiving;
   feedback means for sensing the output and providing a feedback signal in response thereto; and
   controller means for receiving the feedback signal and providing at least one phase control signal to the means for receiving.

* * * * *